United States Patent [19]

Knaul et al.

[11] Patent Number: 4,860,883
[45] Date of Patent: Aug. 29, 1989

[54] APPARATUS FOR CLEANING OF AN ENDLESS CONVEYOR BELT

[75] Inventors: Per Knaul, Speichersdorf; Fritz Schelhorn; Roland Witte, both of Bayreuth, all of Fed. Rep. of Germany

[73] Assignee: B.A.T. Cigarettenfabriken GmbH, Fed. Rep. of Germany

[21] Appl. No.: 115,964

[22] Filed: Nov. 2, 1987

[30] Foreign Application Priority Data

Nov. 3, 1986 [DE] Fed. Rep. of Germany ....... 3637340

[51] Int. Cl.$^4$ .............................................. B65G 45/00
[52] U.S. Cl. .................................................. 198/495
[58] Field of Search ....................... 198/495, 494, 493; 134/166 R; 15/256.5, 256.51, 256.52

[56] References Cited

U.S. PATENT DOCUMENTS

| 3,038,482 | 6/1962 | Mylting | 198/495 X |
|---|---|---|---|
| 3,583,555 | 6/1971 | Katsnak et al. | 198/495 |
| 3,815,728 | 6/1974 | Vaughan | 198/495 |
| 4,073,376 | 2/1978 | Kroos | 198/495 X |
| 4,422,767 | 12/1983 | Yelton | 198/495 X |

FOREIGN PATENT DOCUMENTS

| 2057673 | 5/1972 | Fed. Rep. of Germany . | |
|---|---|---|---|
| 2337394 | 2/1974 | Fed. Rep. of Germany . | |
| 2245538 | 4/1974 | Fed. Rep. of Germany . | |
| 2435924 | 2/1975 | Fed. Rep. of Germany . | |
| 2525267 | 1/1976 | Fed. Rep. of Germany . | |
| 7604054 | 2/1976 | Fed. Rep. of Germany . | |
| 2651716 | 7/1977 | Fed. Rep. of Germany . | |
| 2835472 | 2/1980 | Fed. Rep. of Germany . | |
| 2944340 | 5/1981 | Fed. Rep. of Germany . | |
| 2950346 | 6/1981 | Fed. Rep. of Germany . | |
| 0914432 | 3/1982 | U.S.S.R. | 198/495 |
| 1055706 | 11/1983 | U.S.S.R. | 198/495 |
| 2082133 | 3/1982 | United Kingdom | 198/495 |

Primary Examiner—Robert J. Spar
Assistant Examiner—James R. Bidwell
Attorney, Agent, or Firm—Roylance, Abrams, Berdo & Goodman

[57] ABSTRACT

An endless conveyor belt is washed by a cleaning roller engaging the bottom run of the empty belt. The cleaning roller is sprayed by nozzles set counter to the direction of rotation of the cleaning roller. The surface of the cleaning roller is preferably covered with a felt-like material. Excess cleaning fluid is squeezed out by a pressure roller. A scraper, downstream of the cleaning roller, carries residual dirt or cleaning fluid remaining on the conveyor belt into the housing of the washing apparatus.

10 Claims, 3 Drawing Sheets

APPARATUS FOR CLEANING OF AN ENDLESS CONVEYOR BELT

FIELD OF THE INVENTION

The present invention relates to an apparatus for cleaning an endless conveyor belt, for example a tobacco conveyor belt, to remove debris.

BACKGROUND OF THE INVENTION

In a cigarette manufacturing installation, endless conveyor belts are often used for conveying tobacco. The belts are designed as flat or trough belts. Depending upon the degree of treatment or moisture in the tobacco being conveyed, the conveyor belts are more or less totally polluted during a production cycle. To clean the conveyor belts of adhering dirt or particles of tobacco, it is known, in addition to scraping the conveyor belts, to use washing installations, in which the conveyor belt is wiped or washed with the aid of a cleaning fluid.

A washing installation of this sort is disclosed German Pat. No. 29 50 346. In that patent, an endless washing belt is used, which washing belt is guided by a first roller against the circulating conveyor belt. The conveyor belt is wiped in a direction counter to the direction of conveyor belt movement. The washing belt then passes through a bottom washtub filled with cleaning fluid, and subsequently past a pressure cylinder to squeeze out excess washing fluid from the washing bath. This conventional washing installation is relatively costly, because it requires a suitable washtub which wears out relatively rapidly due to the reciprocal running path of the conveyor belt and because it requires at least two guide rollers. Since the washtub is immersed in the cleaning fluid, this member must be rather large to produce a desirable effect.

In many cases, the cleaning arrangement of German Pat. No. 29 50346 does not adequately clean the convey belt because the material stripped from the conveyor belt by the washing belt is not removed by the washing belt in a single passage through the cleaning bath. Therefore, tobacco residues can remain adherent to the washtub and an additional cleaning of the washtub is required. An additional disadvantage is that the cleaning fluid must be replaced quite frequently to avoid any additional pick-up of tobacco particles during passage through the washtub on the conveyor belt, severely limiting the effectiveness of this washing installation.

Another washing installation is disclosed in U.S. Pat. No. 4,073,376 and German Pat. No. 28 35 472. A washtub is used. However, a washing fluid does not pass through the washtub, but rather is sprayed at an acute angle with a cleaning agent. The washing belt is moistened by the intended moistening, and a certain cleaning effect occurs at the same time. This conventional device also has a spring biased squeegee roller which presses on the washing belt and removes excess fluid. This installation is relatively costly.

SUMMARY OF THE INVENTION

An object of the present invention is to provide an apparatus for cleaning an endless conveyor belt which is simply constructed, requires a small volume of cleaning fluid, has small dimensions and has a wiping device that is cleaned to a high degree.

The foregoing object is obtained by an apparatus for cleaning a conveyor belt comprising a cleaning roller, a spraying device and a pressure roller. The cleaning roller presses against and is rotatably driven in a direction opposite to a part of the conveyor belt engaged by the cleaning roller. The spraying device directs cleaning fluid at an acute angle against a surface area portion of the cleaning roller in a direction counter to movement of the surface area portion. The surface area portion is generally opposite the conveyor belt. The pressure roller follows the spraying device in the direction of the cleaning roller rotation, and engages and removes excess cleaning fluid from the cleaning roller.

The washing or cleaning apparatus according to the present invention can be constructed in a very compact space. The cleaning roller is sprayed at the bottom with a cleaning fluid emitted through spray nozzles. The nozzles are arranged counter to the direction of movement of the cleaning roller, so that the roller is moistened with the cleaning fluid and a remarkable cleaning effect is produced as a result of the sharply defined stream of the cleaning fluid.

The cleaning roller preferably presses, with a certain degree of pressure, against the conveyor belt running freely between two guide rollers. The pressure is adequate to nearly completely clean the conveyor belt. Any dirt or tobacco particles remaining on the conveyor belt and any excess cleaning fluid can be removed by a subsequent or downstream scraper. The scraper trailing edge is arranged so that the wiped-off liquid or particles are carried back into the housing of the washing apparatus.

A pressure or contact roller is provided to limit the volume of cleaning fluid applied to the conveyor belt. The pressure roller presses with a predetermined pressure on the cleaning roller and squeezes out the excess cleaning fluid present in the surface area material of the cleaning roller. The surface area material is preferably a felt-like material. The contact roller is also arranged to prohibit direct spraying of the conveyor belt by the nozzles.

The washing apparatus can preferably be provided with a circulation device. This permits the volume of required cleaning fluid to be kept quite small.

U.S. Pat. No. 4,073,376 to Krooss, which corresponds in substance to German Offenlengungsschrift No. 28 35 472, discloses a spray device which directs a stream of spray at an acute angle against its cleaning belt. However, especially as shown in Krooss FIG. 2, the stream of spray is not directed counter to the direction of movement of the cleaning belt, but is in the direction of cleaning belt movement. The cleaning belt is first moistened by the spray, so that adhering particles can then fall from the belt. Only after a long distance corresponding substantially to the entire length of the cleaning arrangement, excess fluid is squeezed out by a squeegee roller. The spraying cleaning belt essentially only moistens the cleaning belt.

In contrast, the spray effect of the spray nozzles of the present invention is intended simply to spray off particles adhering to the cleaning roller. As a result of the design and arrangement of the spraying device, the present invention ensures that the particles to be removed are sprayed off by the stream of spray directed counter to the direction of movement of the cleaning roller.

In the object of the Krooss patent, it is not guaranteed that the spray stream sprays off the particles to be removed. On the contrary, the particles could even be simply displaced on the cleaning belt in the direction of movement of the cleaning belt by the effect of the spraying.

The advantage of the determination of the direction of the stream of spray in the object of the present invention is still further enhanced if the stream of the spray engages the cleaning roller on an area following the bottommost point of the cleaning roller in the direction of rotation of the cleaning roller. A significant portion of the particles to be removed is already washed away in the bottom area of the cleaning roller by the volume of fluid which is sprayed thereon. The remaining portion is then loosened and removed by the spray stream.

The feature of the present invention of the spraying direction relative to the cleaning roller rotation is also not anticipated or rendered obvious by German Offenlegungsschrift 20 57 673. In that German patent, spray nozzles are aimed directly against the conveyor belt and not against the cleaning roller. The spray nozzles are also not arranged to spray at an acute angle. This arrangement is disadvantageous in that too large a volume of the cleaning fluid directly engages the conveyor belt. Because of this, the device cannot be used for the purpose of the invention. The brush arrangement has the danger that tobacco leaves could be caught in the brushes, necessitating additional cleaning of the brushes, thereby eliminating any advantage.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referrring to the drawings which form a part of this disclosure.

DETAILED DESCRIPTION OF PREFERRED EMBODIMENT

Figure 1:
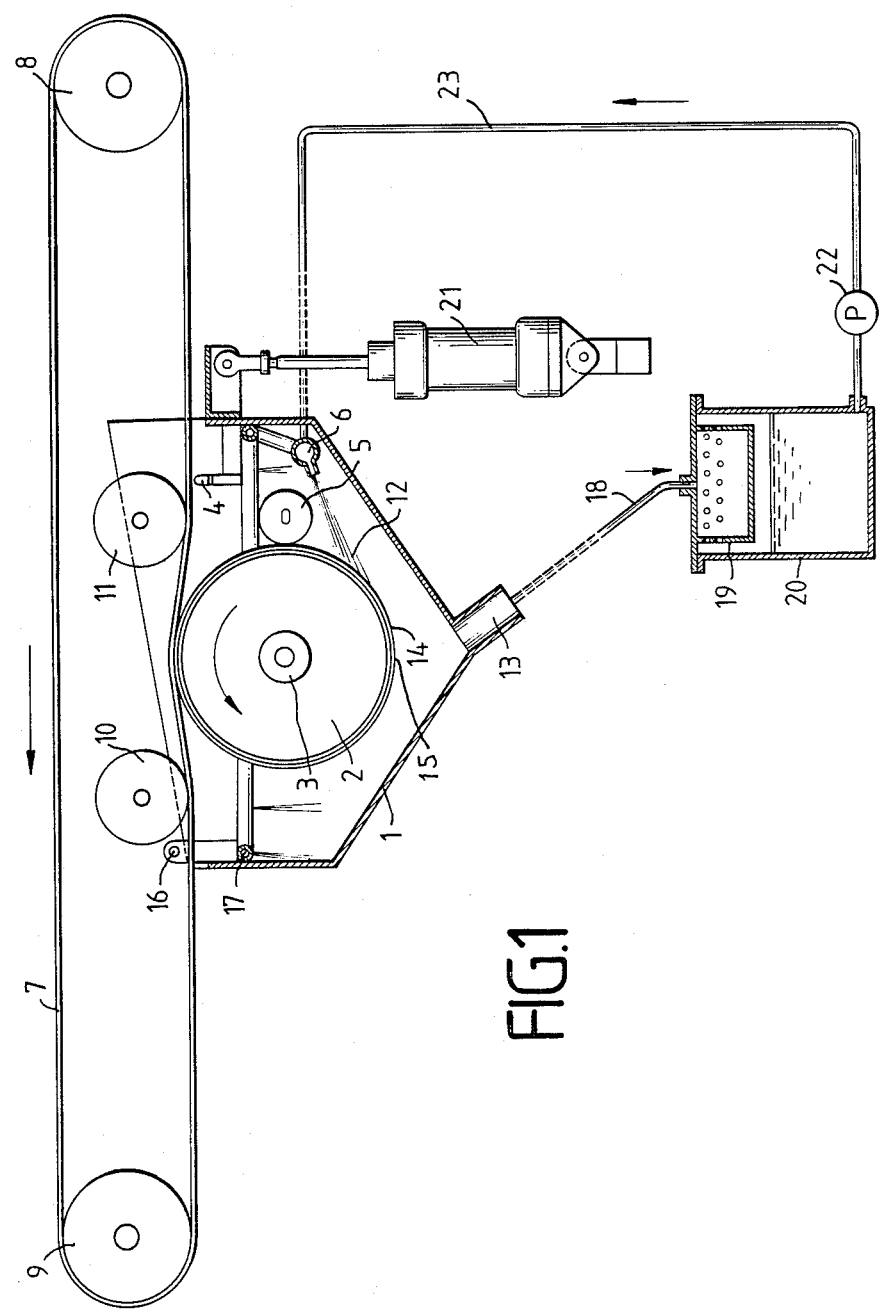
FIG. 1 is a side elevational view in section of an apparatus for cleaning an endless conveyor belt according to the present invention.
Figure 3:
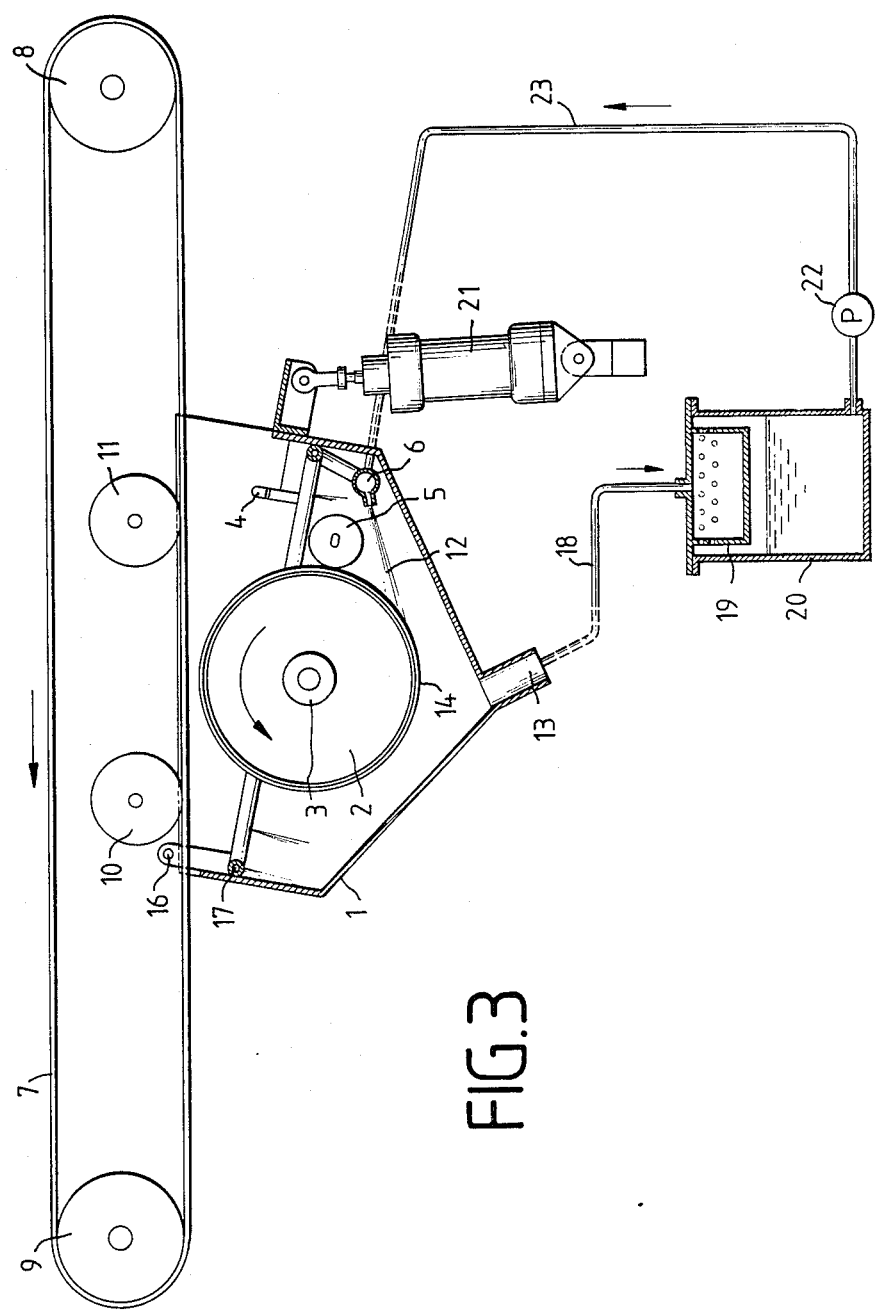
FIG. 3 is a side elevational view in section of the apparatus of FIG. 1 in an inoperative position.

The washing apparatus or installation according to the present invention is shown in transverse section in FIG. 1. The apparatus is located beneath a belt conveyor, which can be configured as trough or flat belt. The apparatus can be stationary and a permanent part of the conveyor belt. Preferably, however, the apparatus is moved from a lower, inoperative position illustrated in FIG. 3, spaced from the conveyor belt, up to an operative position, illustrated in FIG. 1, engaging by the conveyor belt 7 by a lifting device after a production cycle has been terminated. For this movement, the apparatus is preferably suspended on one side of the conveyor belt frame at pivot point 16 and can be lowered by a pneumatic or hydraulic lifting cylinder 21 on the other side to the inoperative position where the cleaning roller no longer contacts with conveyor belt, and/or can be raised into work or operative position for the cleaning.

The main part of the apparatus is the cleaning roller 2 The cleaning roller longitudinal axis is arranged preferably at a right angle to the direction of movement of the conveyor belt. Cleaning roller 2 in its work or operative position, presses against the conveyor belt. Conveyor belt 7 is guided to run freely between two pressdown or bearing rollers 10 and 11, and is also guided around at least two guide rollers 8 and 9. The direction of rotation of the cleaning roller is counter or opposite to the direction of movement of conveyor belt 7 at their point of contact.

Parallel to the axis of the cleaning roller, a cleaning rod arrangement is provided and comprises a set of nozzles 6 within housing 1. The nozzles are arranged in a row, and preferably are flat section nozzles. The direction of the nozzle spray is against the bottom surface area 14 of cleaning roller 2. The direction of the spray places it in an area or surface area portion 12 and is counter to the direction of movement of the cleaning roller. The preferred effected area of the spray, surface area portion 12, is located, in the direction of rotation of the cleaning roller, about directly following the bottom point 15 of the cleaning roller.

The particles of dirt sprayed off in this area drop directly downward into the funnel-like discharge or drain 13, without allowing any further passage along the cleaning roller surface area. The sharply defined stream from nozzle set 6 then effectively loosens the particles of dirt from the cleaning roller surface area and causes this area to be suitably moistened for the next washing step. The surface area of the roller is preferably coated with a felt-like material, most preferably a polyurethane fabric.

Excess fluid can be squeezed out by the contact or pressure roller 5. Pressure roller 5 is arranged at a certain predetermined distance from the cleaning roller surface. This pressure roller is also arranged between the set of nozzles 6 and the conveyor belt 7, so that the stream of spray from the set of nozzles and/or the spray mist cannot reach conveyor belt 7 directly.

Preferably, at the downstream end of the washing apparatus, a scraper 4 is aligned transverse to conveyor belt 7. The scraper optionally can scrape the residual particles still present on the belt or remove the excess cleaning fluid from conveyor belt 7. The waste and excess fluid are guided back into housing 1 of the washing apparatus. The material of the scraper is preferably Gutasyn material or a synthetic hard rubber or the like.

Figure 2:
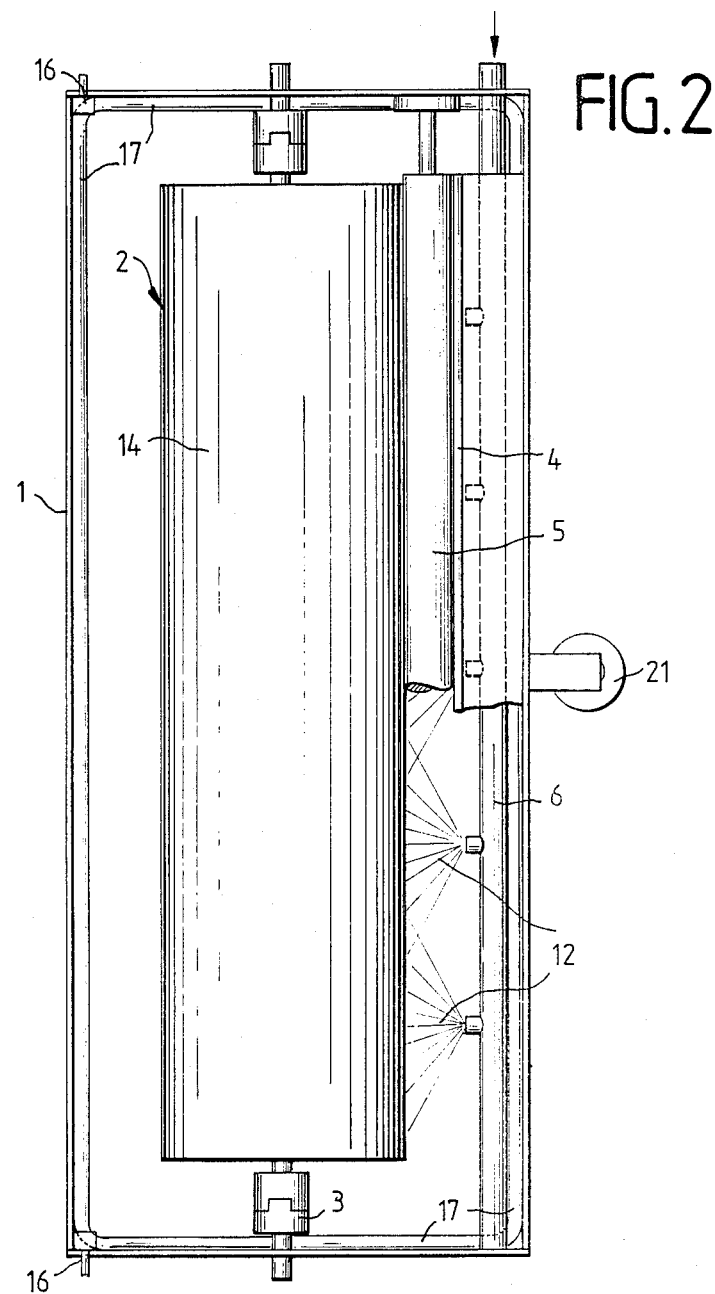
FIG. 2 is a partial top view of the apparatus of FIG. 1.

FIG. 2 shows a plan view of the washing apparatus according to the present invention. Cleaning roller 2 and pressure roller 5 are shifted to the side by quick-change attachments or couplings 3. Pressure roller 5, which is shown only partially in FIG. 2, is shifted to the side in slots arranged radially relative to the cleaning roller. These slots allow a definitive setting of the distance and pressure of the pressure roller relative to the cleaning roller. The set of nozzles 6 is constructed in a lengthwise row with a sufficient number of nozzles that the spray surfaces overlap slightly.

Preferably, a closed circuit ring main 17 is provided for cleaning of the inside of housing 1, the attachments and the other parts of the washing apparatus in the housing. An inside cleaning of the washing apparatus can be undertaken at certain time intervals.

The housing 1 of the cleaning apparatus is preferably configured in the shape of a funnel. A drain 13 is provided on the bottom for discharging polluted cleaning fluid. A drain 13 is provided on the bottom for discharging polluted cleaning fluid. The discharge can be either carried away or recycled using a filter assembly and storage container for spraying again through the nozzles. This recycling provides a very economical operation.

A drive motor is mounted on housing 1 for operating the cleaning roller. The motor works directly on the cleaning roller or carries out the operation by means of a chain drive or transmission.

Substantially, no other changes are required on the conveyor belt, other than adjustment of the two bearing rollers 10 and 11. Rollers 10 and 11 are displaced from the bottom of the top run of conveyor belt 7 to the top of the bottom run of the conveyor belt. The bottom run of the conveyor belt passes beneath the bearing rollers, which then function as press-down rollers 10 and 11, between which press-down rollers the cleaning arrangement is arranged.

The washing apparatus according to the present invention is suitable for flat and for inclined conveyor belts. Quick-change devices are provided for simple transfer of the rollers. The apparatus can be simply assembled, occupies little space, is low-cost, permits automatic inside cleaning and requires only little maintenance.

While a particular embodiment has been chosen to illustrate the invention, it will be understood by those skilled in the art that various changes and modifications can be made therein without departing from the scope of the invention as defined in the appended claims.

What is claimed is:

1. An endless conveyor belt apparatus, comprising:
   an endless conveyor belt for conveying goods including two press down rollers;
   a cleaning roller pressing against and rotatably driven in a direction opposite to a part of the conveyor belt engaged by said cleaning roller, said cleaning roller being movable relative to the conveyor belt between operative and inoperative positions, in said operative position the two press down rollers of the conveyor belt engage and press the conveyor belt against said cleaning roller on opposite sides of said cleaning roller under predetermined pressure;
   spraying means for directing cleaning fluid at an acute angle against a surface area portion of said cleaning roller in a direction counter to movement of said surface area portion, said surface area portion being generally opposite the conveyor belt; and
   pressure roller means, following said spraying means in the direction of cleaning roller rotation, for engaging and removing excess cleaning fluid from said cleaning roller.

2. An apparatus according to claim 1 wherein said cleaning roller is coated with a felt-like material which absorbs liquid.

3. An apparatus according to claim 2 wherein said felt-like material is a polyurethane fabric.

4. An apparatus according to claim 1 wherein said cleaning roller rotates about a horizontal axis; and
   said spraying means comprises flat section nozzles emitting spray streams against said surface area portion, said surface area portion following a bottommost point of said cleaning roller in the direction of cleaning roller rotation.

5. An apparatus according to claim 4 wherein said pressure roller means is arranged between said spraying means and the conveyor belt.

6. An apparatus according to claim 1 wherein said pressure roller means comprises means for applying a fixed pressure exerted against said cleaning roller.

7. An apparatus according to claim 1 wherein said cleaning roller, said spraying means and said pressure roller means are mounted in a housing, said housing also including scraper means, extending transverse to the conveyor belt, for wiping liquid and particles off the conveyor belt and into said housing.

8. An apparatus according to claim 1 wherein said cleaning roller, said spraying means and said pressure roller means are mounted in a housing, said housing comprising discharge outlet means coupled to circulating pump means, a fluid container and filter means.

9. An apparatus according to claim 1 wherein said press down rollers and said cleaning roller are located on opposite surfaces of the conveyor belt.

10. An apparatus according to claim 1 wherein said cleaning roller, said spraying means and said pressure roller means are mounted in a housing, said housing having closed circuit ring means for emitting a cleaning fluid to clean interior parts and surfaces of said housing.

* * * * *